(12) United States Patent
McGlaughlin et al.

(10) Patent No.: US 11,042,441 B2
(45) Date of Patent: Jun. 22, 2021

(54) STRIPE MAPPING IN MEMORY

(71) Applicant: Micron Technology, Inc., Boise, ID (US)

(72) Inventors: Edward McGlaughlin, Minneapolis, MN (US); Joseph M. Jeddeloh, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/458,578

(22) Filed: Jul. 1, 2019

(65) Prior Publication Data
US 2019/0324847 A1 Oct. 24, 2019

Related U.S. Application Data

(63) Continuation of application No. 15/689,114, filed on Aug. 29, 2017, now Pat. No. 10,339,005, which is a (Continued)

(51) Int. Cl.
*G06F 11/10* (2006.01)
*G06F 3/06* (2006.01)

(52) U.S. Cl.
CPC ............ *G06F 11/108* (2013.01); *G06F 3/061* (2013.01); *G06F 3/064* (2013.01); *G06F 3/0614* (2013.01);
(Continued)

(58) Field of Classification Search
CPC ............................. G06F 11/108; G06F 3/0689; G01R 31/31703
See application file for complete search history.

(56) References Cited

U.S. PATENT DOCUMENTS 5,570,376 A * 10/1996 Kunda ................ G06F 11/2257
714/736
6,513,093 B1 * 1/2003 Chen ..................... G06F 3/0617
711/4
(Continued)

FOREIGN PATENT DOCUMENTS

JP  2010015516 A  1/2010
JP  2013536959 A  9/2013
(Continued)

OTHER PUBLICATIONS

International Search Report and Written Opinion from related international application No. PCT/US2016/036138, dated Sep. 7, 2016, 13 pp.
(Continued)

*Primary Examiner* — Steve N Nguyen
(74) *Attorney, Agent, or Firm* — Brooks, Cameron & Huebsch, PLLC (57) ABSTRACT

Examples of the present disclosure provide apparatuses and methods related to redundant array of independent disks (RAID) stripe mapping in memory. An example method comprises writing data in a number of stripes across a storage volume of a plurality of memory devices according to a stripe map; wherein each of the number of stripes includes a number of elements; and wherein the stripe map includes a number of stripe indexes to identify the number of stripes and a number of element identifiers to identify elements included in each of the number of stripes.

20 Claims, 5 Drawing Sheets

Related U.S. Application Data continuation of application No. 14/735,838, filed on Jun. 10, 2015, now Pat. No. 9,766,837.

(52) U.S. Cl.
CPC .......... *G06F 3/0619* (2013.01); *G06F 3/0629* (2013.01); *G06F 3/0656* (2013.01); *G06F 3/0679* (2013.01); *G06F 3/0688* (2013.01); *G06F 3/0689* (2013.01); *G06F 11/10* (2013.01); *G06F 11/1012* (2013.01)

(56) References Cited

U.S. PATENT DOCUMENTS

| | | | |
|---|---|---|---|
| 7,472,251 B2 | 12/2008 | Sasaki | |
| 8,316,260 B1 | 11/2012 | Bonwick | |
| 8,694,849 B1* | 4/2014 | Micheloni | G06F 11/1048 |
| | | | 714/753 |
| 8,694,865 B2 | 4/2014 | Baek et al. | |
| 8,862,818 B1 | 10/2014 | Ozdemir | |
| 8,898,206 B1* | 11/2014 | Jiang | G06F 16/164 |
| | | | 707/822 |
| 8,977,594 B2 | 3/2015 | Whitehead et al. | |
| 8,996,535 B1 | 3/2015 | Kimmel et al. | |
| 9,021,297 B1 | 4/2015 | Hayes et al. | |
| 9,105,305 B2 | 8/2015 | Werner et al. | |
| 9,176,817 B2 | 11/2015 | Cideciyan et al. | |
| 9,442,802 B2 | 9/2016 | Hung et al. | |
| 2002/0066050 A1* | 5/2002 | Lerman | G06F 11/1076 |
| | | | 714/6.22 |
| 2003/0105922 A1* | 6/2003 | Tomita | G06F 11/1076 |
| | | | 711/114 |
| 2003/0145167 A1* | 7/2003 | Tomita | G06F 3/0661 |
| | | | 711/114 |
| 2005/0257083 A1* | 11/2005 | Cousins | G06F 3/0619 |
| | | | 714/6.2 |
| 2006/0087940 A1* | 4/2006 | Brewer | G06F 11/1076 |
| | | | 369/47.12 |
| 2006/0156059 A1* | 7/2006 | Kitamura | G06F 11/1092 |
| | | | 714/6.21 |
| 2009/0240873 A1 | 9/2009 | Yu et al. | |
| 2010/0005228 A1* | 1/2010 | Fukutomi | G06F 11/108 |
| | | | 711/103 |
| 2011/0078496 A1 | 3/2011 | Jeddeloh | |
| 2012/0072680 A1 | 3/2012 | Kimura et al. | |
| 2013/0339580 A1* | 12/2013 | Brandt | G11C 16/10 |
| | | | 711/103 |
| 2014/0025990 A1* | 1/2014 | Akutsu | G06F 3/0619 |
| | | | 714/6.22 |
| 2014/0089630 A1 | 3/2014 | Pignatelli | |
| 2014/0281142 A1* | 9/2014 | Nemazie | G06F 12/0868 |
| | | | 711/103 |
| 2014/0317447 A1 | 10/2014 | Colgrove et al. | |
| 2015/0052393 A1 | 2/2015 | Palmer et al. | |
| 2015/0143198 A1* | 5/2015 | Chun | G06F 11/14 |
| | | | 714/768 |
| 2015/0363118 A1* | 12/2015 | Jernigan | G06F 3/0613 |
| | | | 707/830 |
| 2016/0054920 A1* | 2/2016 | Patterson, III | G06F 3/0683 |
| | | | 714/766 |
| 2016/0196216 A1* | 7/2016 | Lee | G06F 3/0689 |
| | | | 711/170 |

FOREIGN PATENT DOCUMENTS

| | | |
|---|---|---|
| JP | 2013539132 A | 10/2013 |
| TW | 200721125 A | 6/2007 |
| TW | 201131359 A | 9/2011 |
| TW | 201227298 A | 7/2012 |
| TW | 201232264 A | 8/2012 |
| WO | 2013119074 A1 | 8/2013 |

OTHER PUBLICATIONS

Office Action from related Taiwanese patent application No. 105118205, dated Mar. 29, 2017, 25 pp.

Kim, et al. "Chip-Level RAID with Flexible Stripe Size and Parity Placement for Enhanced SSD Reliability," IEEE Transactions on Computers, vol. 65, No. 4, pp. 1116-1130, Apr. 1, 2016.

Supplementary European Search Report from related European application No. 16808099.2, dated Aug. 8, 2018, 7 pages.

Notice of Rejection Ground from related Japanese patent application No. 2017-563321, dated Jun. 19, 2018, 6 pages.

* cited by examiner

| PAGE IDENTIFIER | STRIPE INDEX | STRIPE INDEX | STRIPE INDEX |
|---|---|---|---|
| PI-1 | STRIPE 1 | | |
| PI-2 | STRIPE 1 | STRIPE 2 | |
| PI-3 | STRIPE 1 | STRIPE 2 | |
| PI-4 | STRIPE 1 | STRIPE 2 | STRIPE 3 |
| PI-5 | STRIPE 2 | | |
| PI-6 | STRIPE 2 | | |
| PI-7 | STRIPE 3 | STRIPE V | |
| PI-8 | STRIPE V | | |
| ... | ... | | |
| PI-W | STRIPE-V | | |

Fig. 5

STRIPE MAPPING IN MEMORY

PRIORITY INFORMATION

This application is a Continuation of U.S. application Ser. No. 15/689,114, filed on Aug. 29, 2017, which is a Continuation of U.S. application Ser. No. 14/735,838 filed Jun. 10, 2015, now U.S. Pat. No. 9,766,837, issued on Sep. 19, 2017, the specification of which is incorporated herein by reference.

TECHNICAL FIELD

The present disclosure relates generally to semiconductor memory devices, methods, and systems, and more particularly, to stripe mapping in memory.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored information when not powered and can include NAND flash memory, NOR flash memory, read only memory (ROM), Electrically Erasable Programmable ROM (EEPROM), Erasable Programmable ROM (EPROM), and phase change random access memory (PCRAM), among others.

Memory devices can be combined together to form a solid state drive (SSD). A solid state drive can include non-volatile memory, e.g., NAND flash memory and NOR flash memory, and/or can include volatile memory, e.g., DRAM and SRAM, among various other types of non-volatile and volatile memory. Flash memory devices, including floating gate flash devices and charge trap flash (CTF) devices using semiconductor-oxide-nitride-oxide-semiconductor and metal-oxide-nitride-oxide-semiconductor capacitor structures that store information in charge traps in the nitride layer, may be utilized as non-volatile memory for a wide range of electronic applications. Flash memory devices typically use a one-transistor memory cell that allows for high memory densities, high reliability, and low power consumption.

An SSD can be used to replace hard disk drives as the main storage device for a computer, as the solid state drive can have advantages over hard drives in terms of performance, size, weight, ruggedness, operating temperature range, and power consumption. For example, SSDs can have superior performance when compared to magnetic disk drives due to their lack of moving parts, which may avoid seek time, latency, and other electro-mechanical delays associated with magnetic disk drives. SSD manufacturers can use non-volatile flash memory to create flash SSDs that may not use an internal battery supply, thus allowing the drive to be more versatile and compact.

An SSD can include a number of memory devices, e.g., a number of memory chips (as used herein, "a number of" something can refer to one or more of such things, e.g., a number of memory devices can refer to one or more memory devices). As one of ordinary skill in the art will appreciate, a memory chip can include a number of dies and/or logical units (LUNs). Each die can include a number of memory arrays and peripheral circuitry thereon. The memory arrays can include a number of memory cells organized into a number of physical pages, and the physical pages can be organized into a number of blocks.

A redundant array of independent disks (RAID) is an umbrella term for computer data storage schemes that divide and/or replicate data among multiple memory devices. The multiple memory devices in a RAID array may appear to a user and the operating system of a computer as a single memory device, e.g., disk. Historically, a RAID operated with multiple hard disk drives (HDDs).

DETAILED DESCRIPTION

The present disclosure includes methods and apparatuses for redundant array of independent disks (RAID) stripe mapping in memory. One method embodiment includes writing data in a number of stripes across a storage volume of a plurality of memory devices according to a stripe map; wherein each of the number of stripes includes a number of elements; and wherein the stripe map includes a number of stripe indexes to identify the number of stripes and a number of element identifiers to identify elements included in each of the number of stripes.

In a number of embodiments, a stripe map can be created that is indexed by stripe. The stripe map can include stripe index for each stripe that will be used when writing data to a number of memory devices. The stripe map can also identify each element, e.g., page, on a number of memory devices that will be included in the stripes. For example, the striping map can identify a first stripe with a stripe index of the first stripe and also identify a number of elements, e.g., pages, that will be included in the first stripe. A stripe can include a number of pages and each of the number of pages of a stripe can be coupled to different channels of a memory system.

In a number of embodiments, a stripe map can be used to define stripes in a memory system so that each stripe has elements with varied bit error rates. Memory systems with elements that have varied bit error rates can decrease the likelihood that a particular stripe will have multiple elements that return errors when reading a stripe.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designators "N," "M," "P," "R," "S," "W," and "V", particularly with respect to reference numerals in the drawings, indicates that a number of the particular feature so designated can be included with one or more embodiments of the present disclosure.

The figures herein follow a numbering convention in which the first digit or digits correspond to the drawing figure number and the remaining digits identify an element or component in the drawing. Similar elements or components between different figures may be identified by the use of similar digits. For example, 108 may reference element "08" in FIG. 1, and a similar element may be referenced as 208 in FIG. 2. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate the embodiments of the present invention, and should not be taken in a limiting sense.

Figure 1:
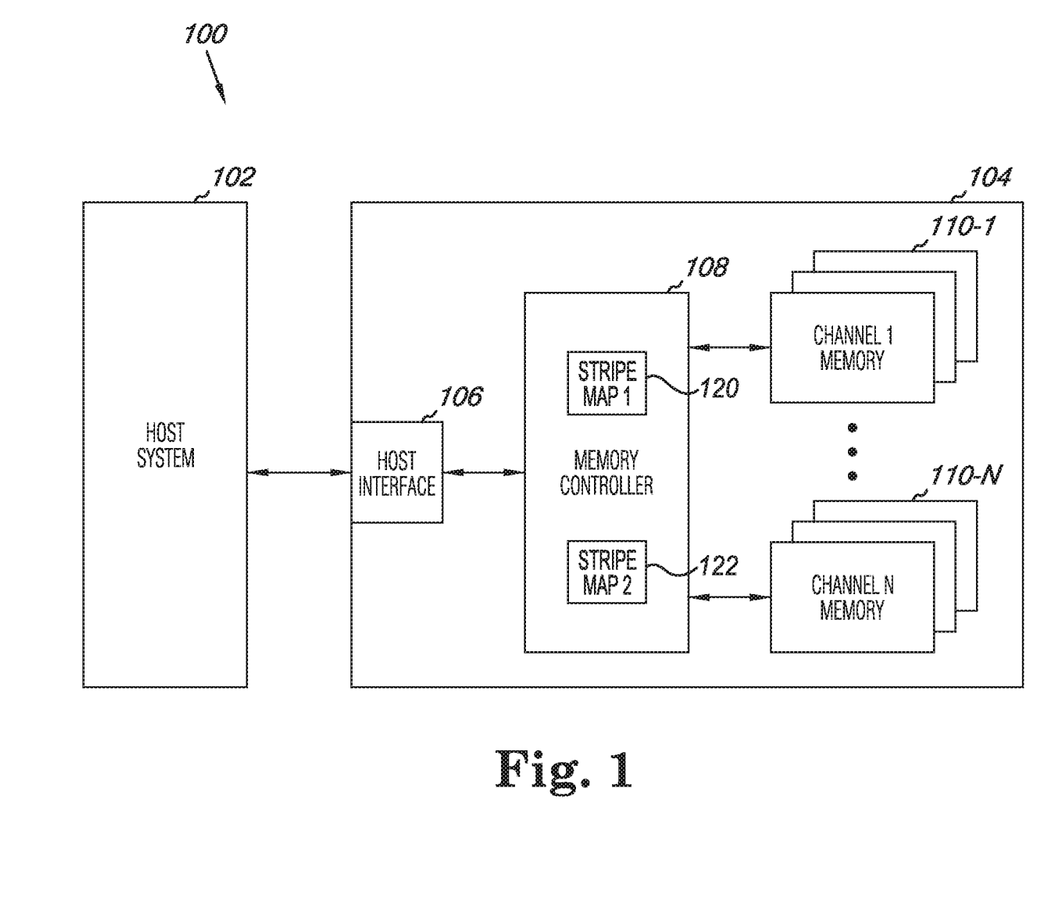
FIG. 1 is a functional block diagram of an apparatus in the form of a computing system including at least one memory system in accordance with a number of embodiments of the present disclosure.

FIG. 1 is a functional block diagram of an apparatus in the form of a computing system including at least one memory system in accordance with a number of embodiments of the present disclosure. As used herein, a host 110, a memory device 120, a memory array, controller, and/or sensing circuitry might also be separately considered an "apparatus." In the embodiment illustrated in FIG. 1, the memory system 104, e.g., a solid state drive (SSD), can include a host interface 106, a memory controller 108, which can be implemented in hardware, e.g., control circuitry, firmware, and/or software, and a number of memory devices 110-1, ..., 110-N, e.g., solid state memory devices including non-volatile multilevel memory cells. The memory devices 110-1, ..., 110-N can provide a storage volume for the memory system, e.g., with a file system formatted to the memory devices. In a number of embodiments, the memory controller 108 can be an application specific integrated circuit (ASIC) coupled to a printed circuit board including the physical host interface 106 and memory devices 110-1, ..., 110-N.

As illustrated in FIG. 1, the memory controller 108 can be coupled to the host interface 106 and to the memory devices 110-1, ..., 110-N by a plurality of channels. The memory controller 108 can be configured to perform the operations described herein, in addition to other memory operations as will be appreciated by those skilled in the art. The host interface 106 can be used to communicate information between the memory system 104 and another device such as a host 102. Host 102 can include a memory access device, e.g., a processor. One of ordinary skill in the art will appreciate that "a processor" can intend a number of processors, such as a parallel processing system, a number of coprocessors, etc. Examples of hosts include laptop computers, personal computers, digital cameras, digital recording and playback devices, mobile telephones, PDAs, memory card readers, interface hubs, and the like. For a number of embodiments, the host interface 106 can be in the form of a standardized interface. For example, when the memory system 104 is used for information storage in a computing system 100, the physical host interface 106 can be a serial advanced technology attachment (SATA), peripheral component interconnect express (PCIe), or a universal serial bus (USB), among other connectors and interfaces. In general, however, host interface 106 can provide an interface for passing control, address, information, and other signals between the memory system 104 and a host system 102 having compatible receptors for the host interface 106.

The memory controller 108 can include host interface circuitry that can be coupled to and/or incorporated with the host interface 106. The host interface circuitry can interface with the host system 102 through a number of layers, e.g., a physical layer, a link layer, and/or a transport layer. One of ordinary skill in the art will appreciate that the number of layers for a particular host interface can be defined by an interface standard such as serial advanced technology attachment (SATA), peripheral component interconnect express (PCIe), universal serial bus (USB), etc. As used herein, a transport layer can indicate at least a transport layer as part of a SATA standard and/or a transaction layer as part of a PCIe standard. One of ordinary skill in the art will appreciate that a transport layer according to a SATA standard can be analogous to a transaction layer according to a PCIe standard. Embodiments are not limited to a particular standard.

In general, the host interface circuitry can convert command packets received from the host system, e.g., from a PCIe bus, into command instructions for converting host-memory translation responses into host system commands for transmission to the requesting host. For example, the host interface circuitry can construct SATA command packets from PCIe based transaction layer packets. The host interface circuitry can be configured to receive information associated with a plurality of addresses from the host system 102.

The memory controller 108 can include host-memory translation circuitry configured to translate host addresses to memory addresses, e.g., addresses associated with a received command such as a read and/or write command. The host-memory translation circuitry might, for example, convert host sector read and write operations to commands directed to specific portions of the memory devices 110-1, ..., 110-N. Each host operation can be translated into single or multi-sector memory device 110-1, ..., 110-N operation. For example, host read and write commands can be translated into memory device 110-1, ..., 110-N read and write commands.

According to a number of embodiments of the present disclosure, write information can be striped across a plurality of channels to a number of solid state memory devices, e.g., in association with a RAID operation. As one of ordinary skill in the art will appreciate, striping includes splitting information so that it is stored across a plurality of channels, for example on more than one device. The portions of the more than one device that store the split information are collectively referred to as a stripe. In contrast, mirroring can include storing duplicate copies of information on more than one device.

The memory controller 108 can maintain an LBA table and/or a block table (not shown). The LBA table can store the physical page address of pages in the number of memory devices 110-1, ..., 110-N and include corresponding logical addresses. The LBA table can be indexed by the LBA that is contained in an associated command, e.g., an associated SATA command. The LBA table can be used to look-up physical page addresses that correspond to logical block addresses where corresponding information can be stored. The block table can store information for erasable blocks in the number of memory devices 110-1, ..., 110-N. Information stored in the block table can include valid page information, erase count, and other status information. Information accessed from the block table can be indexed by physical block address.

The memory controller 108 can communicate with the memory devices 110-1, ..., 110-N to read, write, and erase information, among other operations. Although the memory devices 110-1, ..., 110-N are illustrated being coupled to a collective memory controller 108, a number of embodiments of the present disclosure can include a discrete non-volatile memory controller for each memory channel. A memory device 110-1, ..., 110-N can include a number of arrays of memory cells, e.g., non-volatile memory cells. The arrays can be flash arrays with a NAND architecture, for example. In a NAND architecture, the control gates of memory cells of a "row" can be coupled with an access, e.g., word, line, while the memory cells can be coupled in series source to drain in a "string" between a select gate source transistor and a select gate drain transistor. The string can be connected to a data line, e.g., bit line, by the select gate drain transistor. The use of the terms "row" and "string" implies neither a linear nor an orthogonal arrangement of memory cells. As will be appreciated by those of ordinary skill in the art, the manner of connection of the memory cells to the bit lines and source lines depends on whether the array is a NAND architecture, a NOR architecture, or some other memory array architecture.

The memory devices 110-1, ..., 110-N can include a number of memory cells that can be grouped. As used herein, a group can include a number of memory cells, such as a page, block, plane, die, an entire array, or other groups of memory cells. For example, some memory arrays can include a number of pages of memory cells that make up a block of memory cells. A number of blocks can be included in a plane of memory cells. A number of planes of memory cells can be included on a die. As an example, a 128 GB memory device can include 4314 bytes of information per page, e.g., 4096 bytes of write information plus 218 bytes of overhead information, 128 pages per block, 2048 blocks per plane, and 16 planes per device.

In a number of embodiments, the memory controller 108 can include a first stripe map 120 and a second stripe map 122. In a number of embodiments, at least a portion of the first stripe map 120 and/or at least a portion of the second stripe map 122 can also be stored in the memory devices 110-1, ..., 110-N, in the host system 102, and/or in a separate storage location (not shown). A second stripe map 122 can be an inverse of the first stripe map 102, where both the first and second stripe maps 120 and 122 include the same information, but the first stripe map 120 is indexed by stripe index and the second stripe map 122 is indexed by page identifier. Therefore, the first stripe map 120 can be used to associate a number of pages with a particular stripe and the second stripe map 122 can be used to associate a number of stripes with a particular page. The first stripe map 120 can be a data structure that associates particular pages in memory devices 110-1, ..., 110-N to particular stripes. The first stripe map 120 can include a number of stripe indexes, where each of the number of strip indexes identify a stripe in memory devices 110-1, ..., 110-N. The first stripe map 120 can associate particular pages of memory devices 110-1, ..., 110-N with the stripes identified by the stripe indexes of the first stripe map 120.

In a number of embodiments, the memory controller 108 can select particular pages to associate with particular stripes in the stripe map based on the bit error rate of a particular page and/or a physical location of a particular page within memory devices 110-1, ..., 110-N. For example, the memory controller 108 can select some pages with lower bit error rates and some pages with higher bit error rates to include in the stripes, so that each of the stripes would include pages having a varied bit error rates. Stripes that include pages have a varied bit error rates are less likely to have uncorrectable ECC errors, therefore an ECC operation can be used to correct errors when reading the stripe.

Also, the memory controller 108 can select pages based on the physical location of the pages on memory devices 110-1, ..., 110-N. For example, the memory controller 108 can select some pages that are located near the edge of an array, e.g., "edge pages," and some pages that located towards the center of an array, so that each of the stripes would include pages with varied physical locations on memory devices 110-1, ..., 110-N. The memory controller 108 can include stripes in the stripe map that have a varying number of pages. For example, one stripe can include 6 pages and another stripe can include 5 pages. Also, a particular page can be included in more than one stripe on memory devices 110-1, ..., 110-N.

The page identifiers can include channel, device, block, and/or page information to identify the location of a particular page in memory devices 110-1, ..., 110-N. The page identifiers can include a physical address of the page. The page identifiers can be used by the channel controller 108 to locate the page when performing a read and/or write operation.

The host-memory translation circuitry can include first and/or second level error detection circuitry (not shown in FIG. 1). Although referred to as error detection circuitry, the error detection circuitry can also perform error correction. First level error detection circuitry can be configured to apply error correction such as BCH error correction, as will be understood by one of ordinary skill in the art, to detect and/or correct errors associated with information stored in the memory devices 110-1, ..., 110-N. For example, the first level error detection circuitry can provide 29 bits of error correction over a 1080-bit code word. The second level error detection circuitry can detect errors that are not correctable by the first level error detection, e.g., uncorrectable error correction code (UECC) errors, such as by determining that there are more than a threshold amount of correctable errors. Second level error detection circuitry can include RAID exclusive or (XOR) circuitry. The RAID XOR circuitry can calculate parity information based on information received from the host interface circuitry. For each bit written to a number of the memory devices 110-1, ..., 110-N, a parity bit can be calculated by RAID XOR circuitry and written to a particular one of the memory devices 110-1, ..., 110-N.

The second stripe map 122 can be a data structure that associates particular stripes in memory devices 110-1, ..., 110-N to particular pages in memory devices 110-1, ..., 110-N. The second stripe map 122 can be indexed by page and include a number of page identifiers, where each of the number of page identifiers identify a page in memory devices 110-1, ..., 110-N. The second stripe map 122 can indicate which stripes are associated with pages that are indexed in the second stripe map 122. The second stripe map 122, which is indexed by page, can be the inverse of the first stripe map 120, which is indexed by stripe.

In a number of embodiments, the second stripe map 122 can be used by second level error detection circuitry to perform a RAID read error recovery operation. A RAID read error recovery operation can be performed when an UECC error occurs and data from a bad page that is part of one or more stripes in memory devices 110-1, ..., 110-N can be moved to different pages. A bad page can be a page where a UECC error occurs when performing a read operation. The RAID read error recovery operation can use the second stripe map 122 by locating the page identifier of the bad page in the second stripe map 122 and determine the stripes in memory devices 110-1, . . . , 110-N that included the bad page. The stripes that are identified by the second stripe map 122 as including the bad page can be updated so that the data from the bad page is recovered using parity data and the data is moved to a different page in memory devices 110-1, . . . , 110-N. The first stripe map 120 can then be updated to associate the page identifier of the different page with the updated stripes in memory devices 110-1, . . . , 110-N.

The embodiment of FIG. 1 can include additional circuitry that is not illustrated so as not to obscure embodiments of the present disclosure. For example, the memory system 104 can include address circuitry to latch address signals provided over I/O connections through I/O circuitry. Address signals can be received and decoded by a row decoder and a column decoder to access the memory devices 110-1, . . . , 110-N. It will be appreciated by those skilled in the art that the number of address input connections can depend on the density and architecture of the memory devices 110-1, . . . , 110-N.

Figure 2:
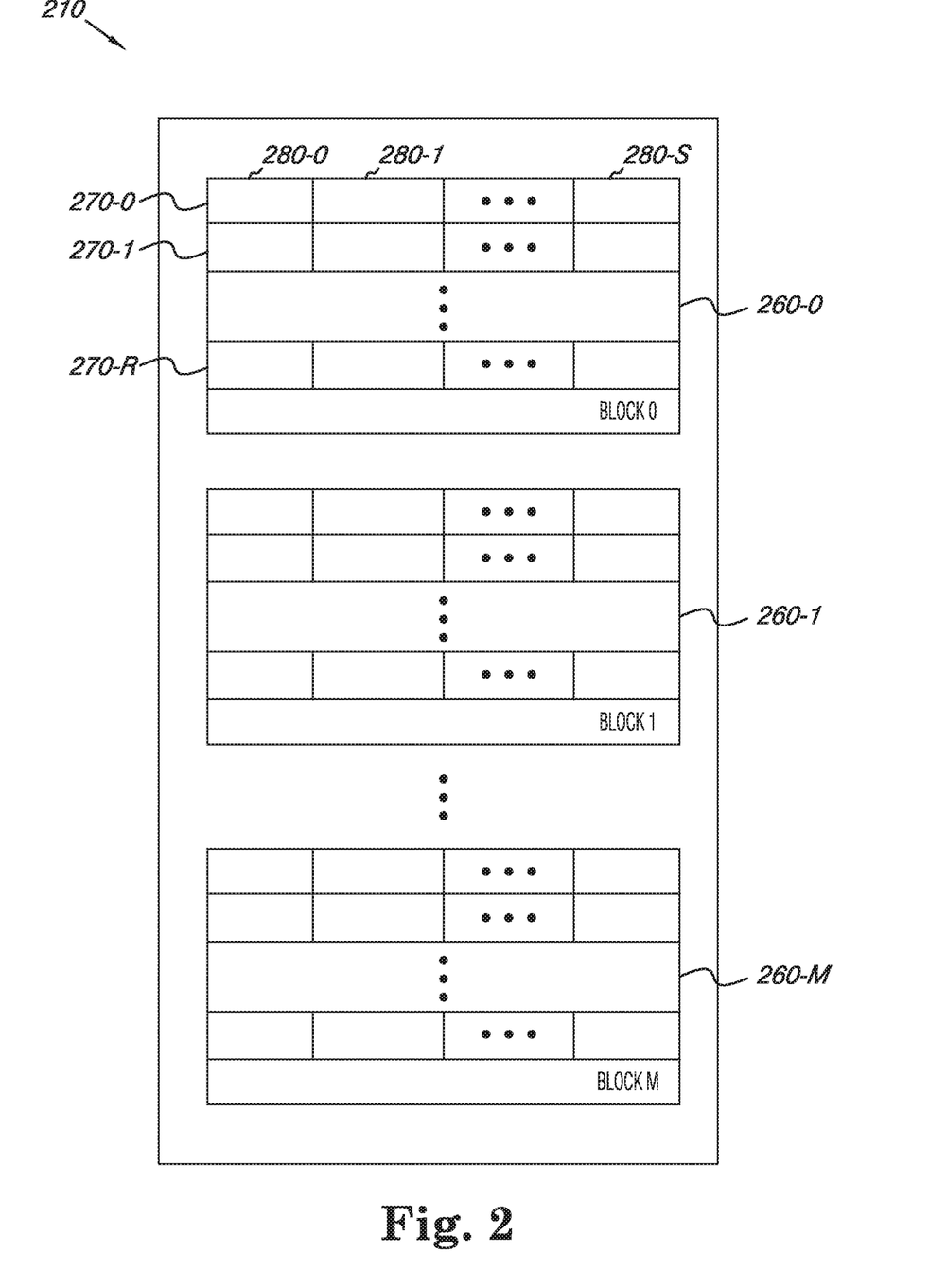
FIG. 2 illustrates a diagram of a portion of a memory device in accordance with a number of embodiments of the present disclosure.

FIG. 2 illustrates a diagram of a portion of a memory device 210 in accordance with a number of embodiments of the present disclosure. Memory device 210 can be a device such as memory devices 110-1 to 110-N shown in FIG. 1.

As shown in FIG. 2, memory device 210 can include a number of physical blocks 260-0 (BLOCK 0), 260-1 (BLOCK 1), . . . , 260-M (BLOCK M) of memory cells. In the example shown in FIG. 2, the indicator "M" is used to indicate that the memory device 210 can include a number of physical blocks. As an example, the number of physical blocks in memory device 210 may be 128 blocks, 4,096 blocks, or 32,768 blocks, however embodiments are not limited to a particular number or multiple of physical blocks in a memory device. In the embodiment illustrated in FIG. 2, the memory device 210 can be, for example, a NAND flash memory device 210 such that, for example, the memory cells in each physical block 260-0, 260-1, . . . , 260-M can be erased together as a unit, e.g., the cells in each physical block can be erased in a substantially simultaneous manner. For instance, the cells in each physical block can be erased together in a single erasing operation.

The indicator "R" is used to indicate that a physical block, e.g., 260-0, 260-1, . . . , 260-M, can include a number of rows. In some embodiments, the number of rows, e.g., word lines, in each physical block can be 32, but embodiments are not limited to a particular number of rows 270-0, 270-1, . . . , 270-R per physical block. As one of ordinary skill in the art will appreciate, each row 270-0, 270-1, . . . , 270-R can include one or more physical pages, e.g., an even page and an odd page. A physical page refers to a unit of writing and/or reading, e.g., a number of cells that are written and/or read together or as a functional group of memory cells. Accordingly, an even page and an odd page can be written and/or read with separate writing and/or reading operations.

In a number of embodiments of the present disclosure, and as shown in FIG. 2, a page can store information in a number of sectors 280-0, 280-1, . . . , 280-S. The indicator "S" is used to indicate that a page can include a number of sectors. Information can include system and/or user data. Each sector 280-0, 280-1, . . . , 280-S can store system and/or user data and can include overhead information, such as error correction code (ECC) information, and logical block address (LBA) information. As one of ordinary skill in the art will appreciate, logical block addressing is a scheme that can be used by a host for identifying a sector of information, e.g., each sector can correspond to a unique LBA. In a number of embodiments, a sector is the smallest addressable portion of a storage volume. As an example, a sector of information can be a number of bytes of information, e.g., 256 bytes, 512 bytes, or 1,024 bytes. For example, an SSD can have 4, 8, or 16 sectors in a page, where a sector can be 512 bytes, and an SSD can have 128, 256, or 512 pages per physical block, therefore physical block sizes are 131072 bytes, 262144 bytes, and 524288 bytes. Embodiments are not limited to these examples.

It is noted that other configurations for the physical blocks 260-0, 260-1, . . . , 260-M, rows 270-0, 270-1, . . . , 270-R, sectors 280-0, 280-1, . . . , 280-S, and pages are possible. For example, the rows 270-0, 270-1, . . . , 270-R of the physical blocks 260-0, 260-1, . . . , 260-M can each store information corresponding to a single sector which can include, for example, more or less than 512 bytes of information.

Figure 3:
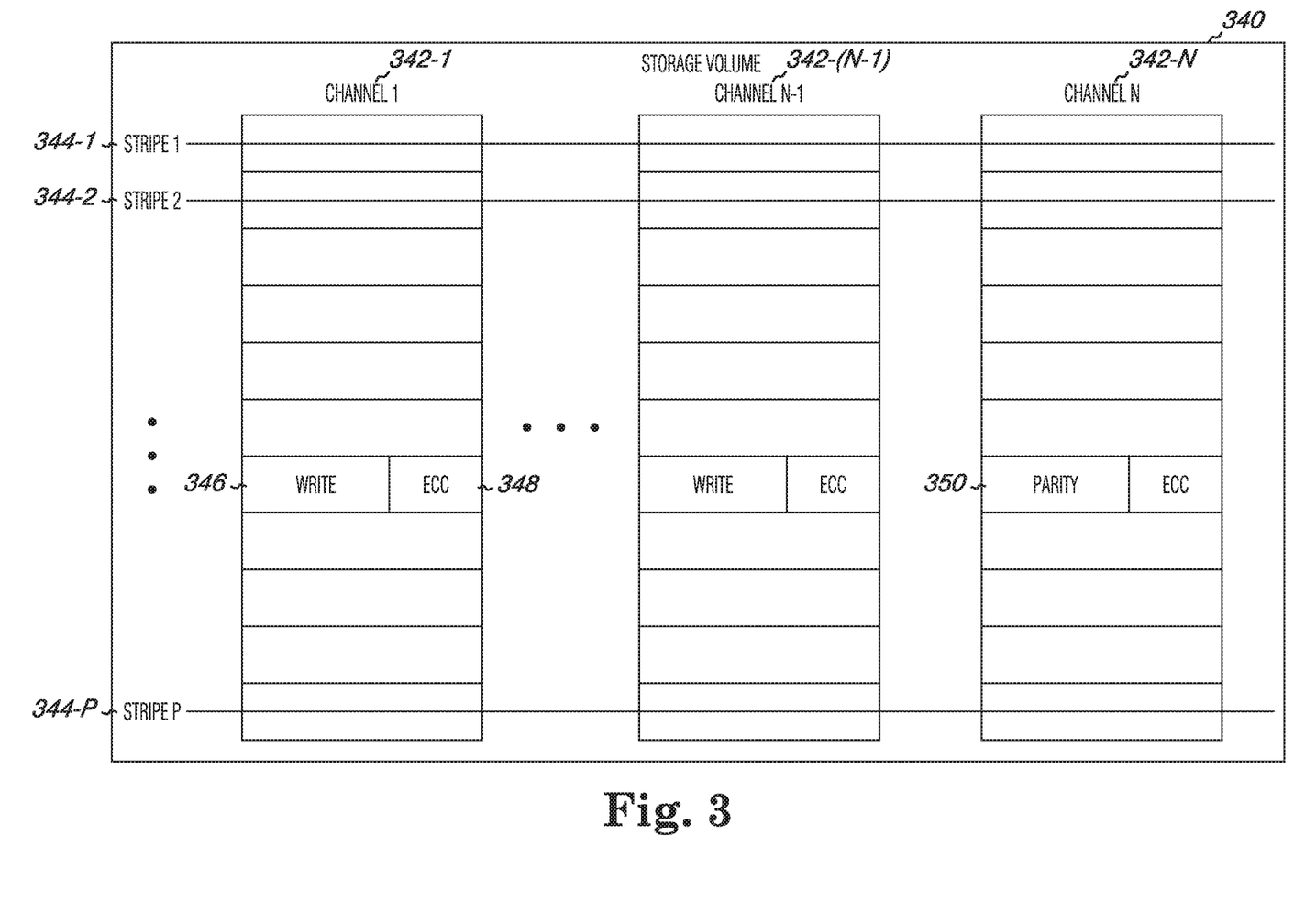
FIG. 3 illustrates a block diagram of a storage volume operated on a stripe-basis.

FIG. 3 illustrates a block diagram of a storage volume 340 operated on a stripe-basis. The storage volume 340 can be provided by a file system formatted to a number of solid state memory devices, e.g., solid state memory devices 110-1, . . . , 110-N in FIG. 1, in a memory system, e.g., memory system 104 in FIG. 1. As described herein, each solid state memory device can be associated with a memory channel 342-1, . . . , 342-(N−1), 342-N. However, embodiments are not limited to one channel per memory device, e.g., memory chip, as some embodiments may include multiple channels per device. One memory chip can be coupled to a memory controller by more than one channel, e.g., in the case of a memory chip including more than one physical plane of memory cells. Information can be written in a number of stripes 344-1, 344-2, . . . , 344-P across the storage volume 340 provided by the number of solid state memory devices.

A memory system can receive write information from a host system, e.g., host 102 shown in FIG. 1. The memory system, e.g., RAID XOR circuitry associated with memory controller 108 in FIG. 1, can calculate parity information for the write information. In a number of embodiments, the write information and parity information can be striped across the storage volume 340 such that write information can be written across a subset of the number of available channels, e.g., channels 342-1, . . . , 342-(N−1) and parity information can be written across a second subset of the number of available channels, e.g., channel 342-N. For example, a memory system can include eight channels where seven channels are used for writing write information and one channel is used for writing parity information. As described herein, parity information can be written across different channels for different stripes. Embodiments are not limited to using N−1 of N channels for write information and a single channel for parity information. According to a number of embodiments of the present disclosure, RAID structure and/or stripe size can be programmable options.

A RAID structure can represent an implementation of a RAID storage scheme devised to divide and/or replicate information across multiple memory devices. For example, information can be striped and/or mirrored across two or more devices. Striping can include dividing write information into elements and storing at least one element in each of a number of memory devices. Mirroring can include redundantly storing a copy of write information in at least two memory devices. Both striping and mirroring can include the use of error detection. Parity information can be stored in the same memory devices as write information and/or in a separate device from the devices storing write information.

According to a number of embodiments of the present disclosure, the particular RAID structure to be implemented by a memory system can be a programmable option.

As used herein, a stripe size can refer to the number of channels across which information is striped. According to a number of embodiments of the present disclosure, a stripe size for a memory system can be a programmable option such that any number of the channels available to the memory system can be used for a stripe. For example, a memory system including 32 channels and a number of corresponding memory devices can have any stripe size from 2 to 32 channels. Some embodiments can include logically segregating a non-volatile memory into at least two portions, each portion including a subset of the number of channels associated with the non-volatile memory. Such embodiments can include operating the non-volatile memory system on a stripe basis for each of the at least two portions independently. For example, a number of pages of write information and parity information can be written in each stripe, where a first stripe is written across only one subset of the number of channels of the memory system and a second stripe is written across only a different subset of the number of channels of the memory system. Furthermore, a stripe size can change during operation of the memory system. A block table can be used to keep track of which portions of the memory system correspond to which stripes.

ECC circuitry associated with the memory controller 108 in FIG. 1 can calculate first level error correction information for elements of write information and/or second level correction, e.g., parity, information stored in the memory devices. FIG. 3 includes an illustration of write information 346 and first level error correction information 348 being stored in association with channels 342-1, . . . , 342-(N−1) and parity information 350 and first level error correction information 348 being stored in association with channel 342-N. When a stripe is written, both write information and error correction information can be written together. If an error is detected in information, whether write information or parity information, first level error correction information can be used in an attempt to correct the error before and/or without implementing a second level of error correction, e.g., the correction associated with parity information described above. A memory system may store sufficient first level error correction information to enable a threshold number of erroneous bits to be corrected. If an error is detected, e.g., a UECC error during a write operation, that includes more bit errors than are correctable with the first level error correction information, then the second level of error correction, e.g., using the second stripe map and the parity information described above, may be implemented, e.g., the information associated with the error(s) may be recreated using parity information and a remainder of the write information.

Figure 4:
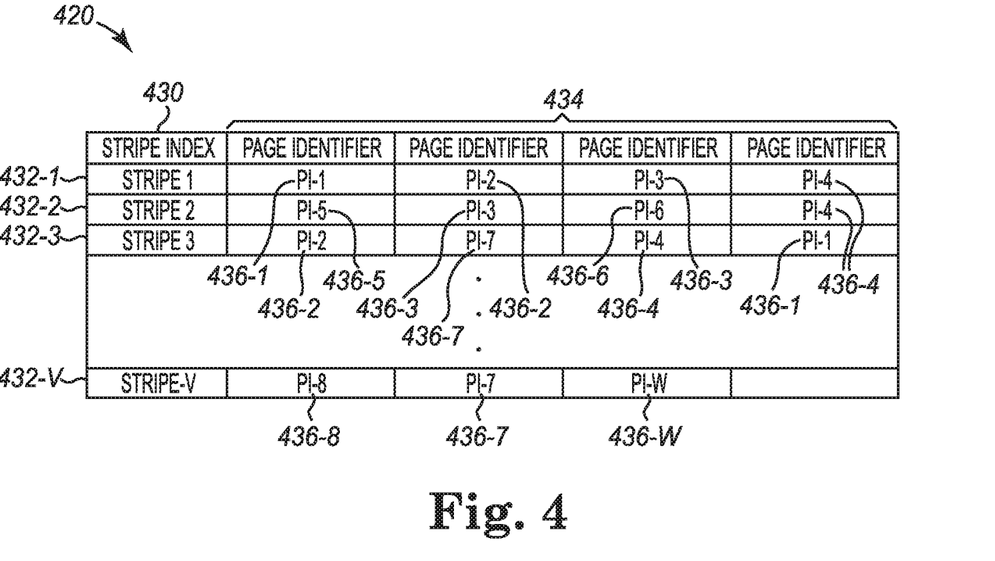
FIG. 4 illustrates a stripe map in accordance with a number of embodiments of the present disclosure.

FIG. 4 illustrates a stripe map 420 in accordance with a number of embodiments of the present disclosure. Although "pages" are referred to in this example, stripes can comprise elements other than pages.

In the example shown in FIG. 4, the stripe map 420 is a table including a stripe index column 430 and a number of page identifier columns 434. In FIG. 4, a number of stripes are indicated by stripe indexes 432-1, 432-2, 432-3, . . . , 432-V. Each of stripe indexes 432-1, 432-2, 432-3, . . . , 432-V are associated with a number of pages. For example, stripe index 432-1 is associated with page identifiers 436-1, 436-2, 436-3, and 436-4; stripe index 432-2 is associated with page identifiers 436-5, 436-3, 436-6, and 436-4; stripe index 432-3 is associated with page identifiers 436-2, 436-7, 436-4, and 436-1; and stripe index 432-V is associated with page identifiers 436-8, 436-7, 436-4, and 436-W. Two or more stripes can include common pages. For example, stripe indexes 432-1, 432-2, and 432-3 are all associated with page identifier 436-4. Also, stripes can be associated with different numbers of pages. For example, stripe index 432-1 is associated with four pages and stripe index 432-V is associated with three pages.

Data can be written to memory devices according the stripe map so that when data is written to a stripe identified by a stripe index, the data will be written to the associated pages as indicated in the stripe map. For example, when writing the stripe indicated by stripe index 432-1, data will be written to the pages identified by page identifiers 436-1, 436-2, 436-3, and 436-4. The page identifiers can include channel, device, block, and/or page information. Also, each stripe can include a parity page and the parity page of each stripe can be indicated by the page identifier in one of the columns of the stripe map. For example, the parity page of each stripe can be identified by the page identifier in the second column of the stripe map.

Figure 5:
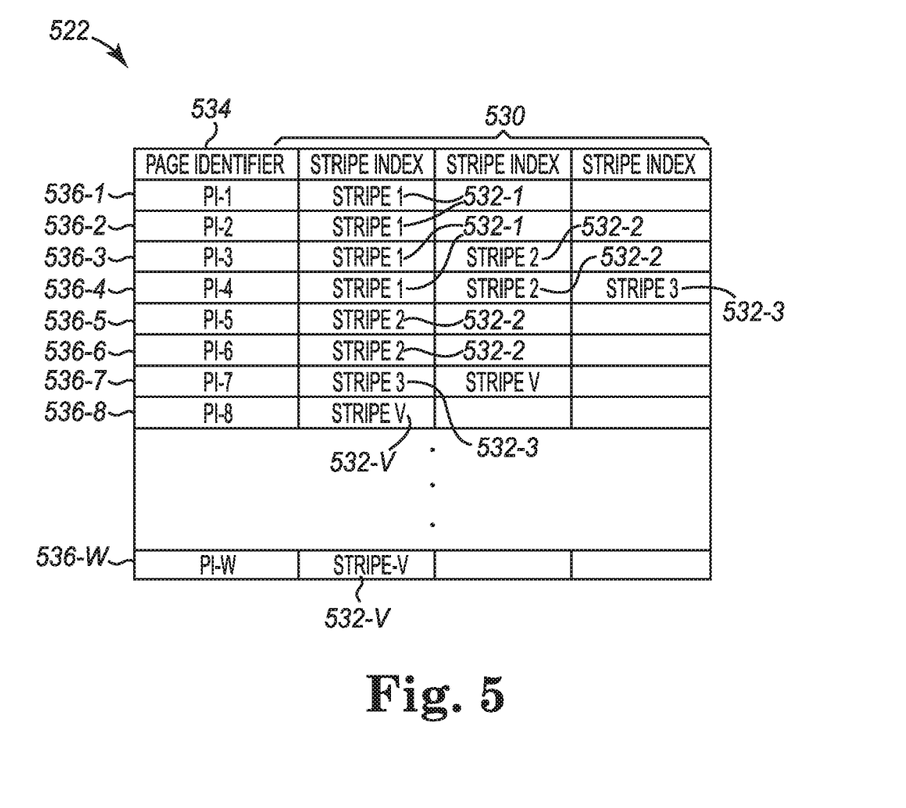
FIG. 5 illustrates a stripe map in accordance with a number of embodiments of the present disclosure.

FIG. 5 illustrates a stripe map 522 in accordance with a number of embodiments of the present disclosure. Although "pages" are referred to in this example, stripes can comprise elements other than pages. Stripe map 522 can be an inverse of stripe map 420 described above in association with FIG. 4. In the example shown in FIG. 5 the stripe map 522 is a table including a number of stripe index columns 430 and a page identifier column 534. In FIG. 5, a number of pages are indicated by page identifiers 536-1, 536-2, 536-3, 536-4, 536-5, 536-6, 536-7, 536-8 . . . , 532-V. Each of the page identifiers 536-1, 536-2, 536-3, 536-4, 536-5, 536-6, 536-7, 536-8 . . . , 532-V are associated with a number of stripes indicated by striped indexes 532-1, 532-2, 532-3, . . . , 532-V. For example, page identifier 536-3 is associated the stripes that are referenced by stripe indexes 532-1 and 532-2. Therefore, in response to an UECC error, the stripe map table 531 can be used to perform a RAID read error recovery operation. A RAID read error recovery operation can include moving data from a bad page that is part of one or more stripes to different pages. The RAID read error recovery operation can use the stripe map 522 to locate the page identifier of the bad page in the stripe map 522 and determine the stripes that included the bad page. The stripes that are identified by the stripe map 522 as including the bad page can be updated so that the data from the bad page is recovered using parity data and the data is moved to a different page. Stripe map 420 from FIG. 4 can then be updated to associate the page identifier of the different page with the updated stripes.

The present disclosure includes methods and devices for RAID stripe mapping in memory. One method embodiment includes writing data in a number of stripes across a storage volume of a plurality of memory devices according to a stripe map; wherein each of the number of stripes includes a number of elements; and wherein the stripe map includes a number of stripe indexes to identify the number of stripes and a number of element identifiers to identify elements included in each of the number of stripes.

Although specific embodiments have been illustrated and described herein, those of ordinary skill in the art will appreciate that an arrangement calculated to achieve the same results can be substituted for the specific embodiments shown. This disclosure is intended to cover adaptations or variations of a number of embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the a number of embodiments of the present disclosure includes other applications in which the above structures and methods are used. Therefore, the scope of a number of embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for stripe mapping, comprising:
performing a read error recovery operation using a first stripe map to identify a plurality of stripes that include a number of bad elements, wherein each of the plurality of stripes include each of the number of bad elements and wherein the read error recovery operation corrects data from the number of bad elements in each of the plurality of stripes using parity data, moves the corrected data to a different number of elements, and updates the first stripe map to include element identifiers of the different number of elements in each stripe of the plurality of stripes, wherein the different number of elements that store the corrected data are included in each stripe of the plurality of stripes in response to the read error recovery operation.

2. The method of claim 1, further including performing the read error recovery operation by locating the number of bad elements in the plurality of stripes using the first stripe map and updating element identifiers for each of the plurality of stripes associated with the number of bad elements in a second stripe map.

3. The method of claim 2, wherein further including creating the second stripe map by identifying each of the different number of elements with a page identifier.

4. The method of claim 2, wherein the method includes updating the second stripe map by removing element identifiers of the number of bad elements from the second stripe map.

5. The method of claim 2, wherein the method includes updating the second stripe map by replacing element identifiers of the number of bad elements with element identifiers of the different number of elements.

6. The method claim 2, wherein the second stripe map includes a page element identifier in each of the plurality of stripes.

7. The method of claim 1, wherein the method includes performing the read error recovery operation in response to an error correction code (ECC) operation failure.

8. An apparatus, comprising:
a number of memory devices; and
a controller coupled to the number of memory devices and configured to:
write data to the number of memory devices, wherein the data is written to elements of a plurality of stripes as defined by a first stripe map; and
perform a read error recovery operation using a second stripe map, wherein the read error recovery operation corrects data from a bad element in each of the plurality of stripes using parity data and moves the corrected data to a different element, wherein the bad element is in each of the plurality of stripes; and
update the second stripe map to include an element identifier of the different element in each stripe of the plurality of stripes, wherein the different element stores the corrected data and is included in each stripe of the plurality of stripes in response to the read error recovery operation.

9. The apparatus of claim 8, wherein element identifiers for each element of the plurality of stripes includes channel, device, block, and page information.

10. The apparatus of claim 8, wherein elements of each stripe of the plurality of stripes include varied bit error rates.

11. The apparatus of claim 8, wherein elements of each stripe of the plurality of stripes are selected based on physical locations in the number of memory devices.

12. The apparatus of claim 8, wherein the controller is configured to perform the read error recovery operation using the second stipe map to identify a portion of the plurality of stripes that each include a number of bad elements.

13. The apparatus of claim 8, wherein the controller is configured to update the first stripe map based on the read error recovery operation.

14. A method for stripe mapping, comprising:
performing a redundant array of independent disks (RAID) read error recovery operation using a first stripe map to identify a plurality of stripes that include a bad element, wherein the bad element in each stripe of the plurality of stripes and wherein the RAID read error recovery operation corrects data in the bad element using parity data, moves the corrected data to a different element, and updates element identifiers in each stripe of the plurality of stripes to include an identifier for the different element, wherein the different element that stores the corrected data is included in each stripe of the plurality of stripes in response to the read error recovery operation.

15. The method of claim 14, wherein the method includes creating a second stripe map by associating each of a number of stripe indexes with a portion of the elements included in each of the plurality of stripes.

16. The method of claim 14, wherein the method includes creating a second stripe map by associating each of the plurality of stripes with a page element identifier.

17. The method of claim 14, wherein the method includes creating a second stripe map by selecting the elements to include in the plurality of stripes based on a bit error rate associated with the elements.

18. The method of claim 14, wherein the method includes creating a second stripe map by selecting the pages to include in the plurality of stripes based on a location of the pages within a memory device.

19. The method of claim 14, further including writing data in the plurality of stripes includes splitting the data into a number of elements and writing the number of elements to a plurality of memory devices.

20. The method of claim 19, further including writing the number of elements to the plurality of memory devices includes writing at least one element to each of the plurality of memory devices.

* * * * *